United States Patent
Lee et al.

(10) Patent No.: US 10,307,946 B2
(45) Date of Patent: Jun. 4, 2019

(54) METHOD OF MAKING SIDE STEP FOR VEHICLE

(71) Applicants: Hyundai Motor Company, Seoul (KR); LG Hausys, Ltd., Seoul (KR)

(72) Inventors: Seung Mok Lee, Gyeonggi-do (KR); Kwang Jae Choi, Gyeonggi-do (KR); Nam Cheol Kim, Gyeonggi-do (KR); Seung Ryong Jeong, Ulsan (KR); Sung Jun Hong, Chungcheongbuk-do (KR); Woo Jin Jung, Ulsan (KR); Chun Ho Park, Chungcheongbuk-Do (KR)

(73) Assignees: Hyundai Motor Company, Seoul (KR); LG Hausys, Ltd., Seoul (KR)

( * ) Notice: Subject to any disclaimer, the term of this patent is extended or adjusted under 35 U.S.C. 154(b) by 499 days.

(21) Appl. No.: 15/152,735

(22) Filed: May 12, 2016

(65) Prior Publication Data

US 2017/0157817 A1 Jun. 8, 2017

(30) Foreign Application Priority Data

Dec. 2, 2015 (KR) .......... 10-2015-0170584

(51) Int. Cl.
*B60R 3/00* (2006.01)
*B29C 45/14* (2006.01)
*B29K 23/00* (2006.01)
*B29K 105/12* (2006.01)
(Continued)

(52) U.S. Cl.
CPC ........ *B29C 45/14* (2013.01); *B29C 45/14336* (2013.01); *B29C 45/14565* (2013.01); *B60R 3/002* (2013.01); *B29K 2023/12* (2013.01); *B29K 2105/12* (2013.01);
(Continued)

(58) Field of Classification Search
CPC ......... B23P 2700/50; B60R 3/002; B60R 3/02
See application file for complete search history.

(56) References Cited

U.S. PATENT DOCUMENTS 6,173,979 B1 * 1/2001 Bernard .................. B60R 3/002
280/163
8,016,309 B2 * 9/2011 Flajnik .................... B60R 3/002
280/163

(Continued)

FOREIGN PATENT DOCUMENTS

JP 2001-171010 A 6/2001
JP 2009-023391 A 2/2009
(Continued)

OTHER PUBLICATIONS

Machine Translation of Kato Fuyuki. "Side Step for Vehicle". Feb. 2009.*

*Primary Examiner* — David P Bryant
*Assistant Examiner* — Nirvana Deonauth
(74) *Attorney, Agent, or Firm* — Mintz Levin Cohn Ferris Glovsky and Popeo, P.C.; Peter F. Corless

(57) ABSTRACT

A method of making a side step of a vehicle includes a bracket that is mounted to a vehicle body and an insert main body that bears weight of passengers. The bracket and the insert main body are integrally provided by using a CFT material through insert-molding, and an injection molding resin is coupled to all over the insert main body where the bracket is coupled through insert-molding so as to form a main frame of the side step.

11 Claims, 4 Drawing Sheets

(51) Int. Cl.
*B29K 307/04* (2006.01)
*B29K 309/08* (2006.01)

(52) U.S. Cl.
CPC ...... *B29K 2307/04* (2013.01); *B29K 2309/08* (2013.01); *B60Y 2304/03* (2013.01); *B60Y 2304/05* (2013.01)

(56) References Cited

U.S. PATENT DOCUMENTS

| | | | | |
|---|---|---|---|---|
| 8,043,537 | B2* | 10/2011 | Shikase | B29C 45/78 264/328.16 |
| 2003/0006576 | A1* | 1/2003 | Lanoue | B60R 3/002 280/163 |
| 2006/0249924 | A1* | 11/2006 | Armstrong | B60R 3/002 280/163 |
| 2009/0121449 | A1* | 5/2009 | Kuntze | B60R 3/00 280/163 |
| 2013/0323454 | A1* | 12/2013 | Chapman | B60R 3/002 280/163 |

FOREIGN PATENT DOCUMENTS

| | | | |
|---|---|---|---|
| JP | 2009023391 A * | 2/2009 | |
| JP | 2011-105263 A | 6/2011 | |
| JP | 2011-105269 A | 6/2011 | |
| JP | 2011-183834 A | 9/2011 | |
| KR | 10-2006-0025050 A | 3/2006 | |
| KR | 10-0633624 B1 | 10/2006 | |
| KR | 10-1179016 B1 | 8/2012 | |

\* cited by examiner

METHOD OF MAKING SIDE STEP FOR VEHICLE

CROSS REFERENCE TO RELATED APPLICATION

The present application claims under 35 U.S.C. § 119(a) the benefit of Korean Patent Application No. 10-2015-0170584, filed Dec. 2, 2015, the entire contents of which are incorporated by reference herein.

BACKGROUND

1. Field of the Invention

The present invention generally relates to a method of making a side step for a vehicle, more particularly, to a method of making a side step that has good mechanical properties, in which the method is capable of improving degrees of freedom in design, and reducing weight and manufacturing cost.

2. Description of the Related Art

Generally, a side step of a vehicle is mounted at a lower portion of each left and right door of a van that has a high ground clearance so as to offer improved convenience when passengers enter or exit the vehicle by enabling the passengers to step on the side step. For example, in the case of a Recreational Vehicle (RV) or a Sports Utility Vehicle (SUV), the interior floor thereof is higher than that of a conventional passenger vehicle, thereby offering inconvenience to young children or the elderly when entering or exiting the vehicle. Therefore, the vehicle may be provided with a side step that is mounted at a lower side of the vehicle body so as to help passengers to enter or exit the vehicle.

A conventional side step typically is formed as a large-sized component, which is long in a longitudinal direction thereof, and manufactured by mainly using a thermoplastic resin, aluminum, and steel. In other words, components that bear a weight of passengers when getting in or getting out of a vehicle are made of aluminum through extrusion-molding, components that cover an exterior of a vehicle are made of a thermoplastic elastomer through injection-molding, and a plurality of brackets that connect a vehicle body and the side step are made of steel plate cold commercial (SPCC) through press-forming.

In vehicle development, one of the major issues is to improve gas mileage by reducing a weight of a vehicle. However, the conventional side step used as an accessory is problematic in that the conventional side step is manufactured by mainly using aluminum or steel, thereby increasing weight and lowering gas mileage. In particular, the conventional side step is problematic in that the conventional side step is low in degrees of freedom in design, and the manufacturing cost increases due to a large number of components.

The foregoing is intended merely to aid in the understanding of the background of the present invention, and is not intended to mean that the present invention falls within the purview of the related art that is already known to those skilled in the art.

SUMMARY

The present invention is directed to a method of making a side step for a vehicle, which is capable of improving degrees of freedom in design, and reducing weight and manufacturing cost by integrally manufacturing major components of the side step using a CFT material through insert-molding. Further, the side step has good mechanical properties and structural rigidity, whereby it is possible to improve marketability.

In order to achieve the above object, according to one aspect of the present invention, there is provided a method of making a side step for a vehicle, the method including steps of: injection-molding at least one bracket using a continuous fiber thermoplastic (CFT) material, the bracket being mounted to a vehicle body and an insert main body that is integrally coupled to the bracket; insert-molding a main frame by injecting an injection molding resin to all over the insert main body coupled to the bracket; and manufacturing a side step by assembling a step cover and a step plate with the main frame.

Injection-molding the bracket includes: layering at least two heated CFT materials after primarily heating the CFT materials to a predetermined temperature; and molding the layered CFT materials after secondarily heating the layered CFT materials to a predetermined temperature.

The insert-molding the main frame includes: disposing the at least one bracket in a mold while spacing the bracket from an adjacent bracket at a predetermined interval; and injection-molding the CFT material for allowing the insert main body to be integrally coupled to the bracket.

The bracket and the insert main body are made of the same material so that the bracket and the insert main body are integrally coupled to each other through adhesion between material surfaces thereof caused by high temperature during the injection-molding.

When the injection molding resin is injected to the insert main body during the insert-molding, a support injection molding resin is integrally molded to each of opposite longitudinal ends of the insert main body.

The manufacturing the side step includes: seating the step cover on the main frame; seating the step plate on the step cover; and integrally assembling the main frame, the step cover, and the step plate using a locking mechanism that is integrally provided in the step plate.

The insert main body includes about 30 to 50% by weight of polypropylene (PP), about 50 to 70% by weight of glass fiber (GF), and other inevitable impurities.

The insert main body includes about 40% by weight of polypropylene (PP) and about 60% by weight of glass fiber (GF).

The insert main body is provided with a section having a successive convex-concave shape to improve rigidity thereof.

The injection molding resin includes about 50 to 70% by weight of polypropylene (PP), about 30 to 50% by weight of long glass fiber (LGF), and other inevitable impurities.

The injection molding resin includes about 60% by weight of polypropylene (PP) and about 40% by weight of long glass fiber (LGF).

The main frame is provided with ribs along a longitudinal direction of the main frame to improve rigidity thereof during the insert-molding the main frame by injecting the injection molding resin, the ribs being spaced apart from each other at a predetermined interval.

According to the present invention, the side step for a vehicle is configured such that the bracket that is coupled to a vehicle body and the insert main body that bears weight of passengers are integrally provided by using the CFT material through insert-molding. In addition, the injection molding resin is coupled to all over the insert main body where the bracket is coupled, through insert-molding, thereby forming the main frame of the side step. Thus, it is possible to have structural rigidity and improved crash-worthiness, and to reduce weight and manufacturing cost. Further, it is possible to improve degrees of freedom in design. In particular, it is possible to considerably improve the structural rigidity of all assemblies where the step plate and the step cover are assembled, whereby it is also possible to improve marketability

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
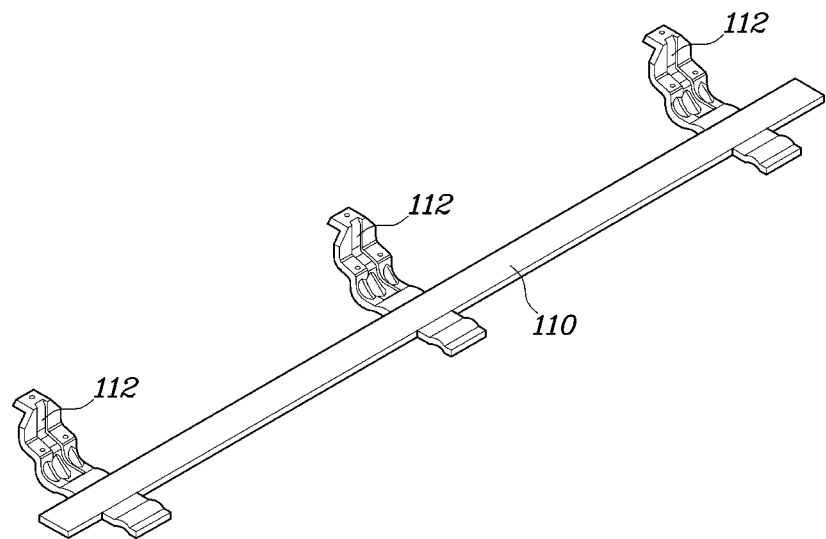
FIG. 1 is a perspective view showing an insert main body and a bracket that form a main frame according to the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a method of making a side step for a vehicle according to exemplary embodiments of the present invention will be described in detail with reference to the accompanying drawings. Throughout the drawings, the same reference numerals will refer to the same or like parts.

Figure 2:
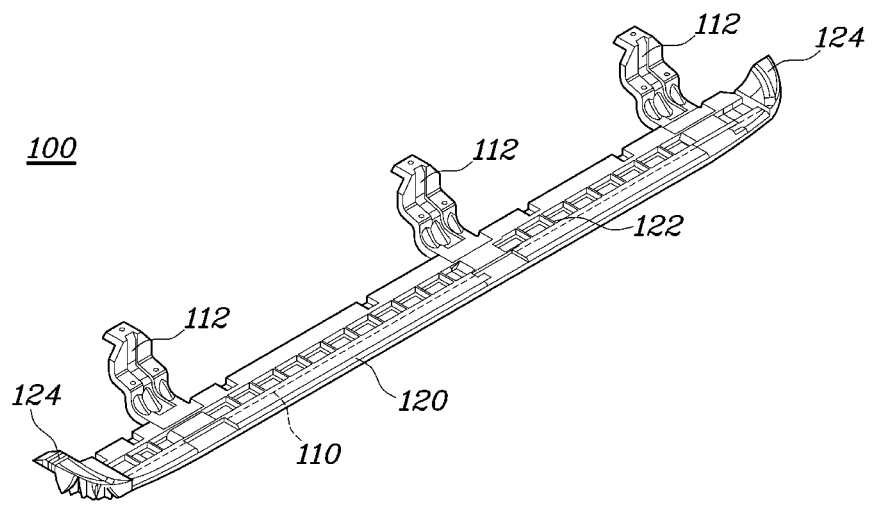
FIG. 2 is a perspective view showing the main frame in a state where an injection molding resin is coupled to the insert main body according to the present invention.
Figure 3:
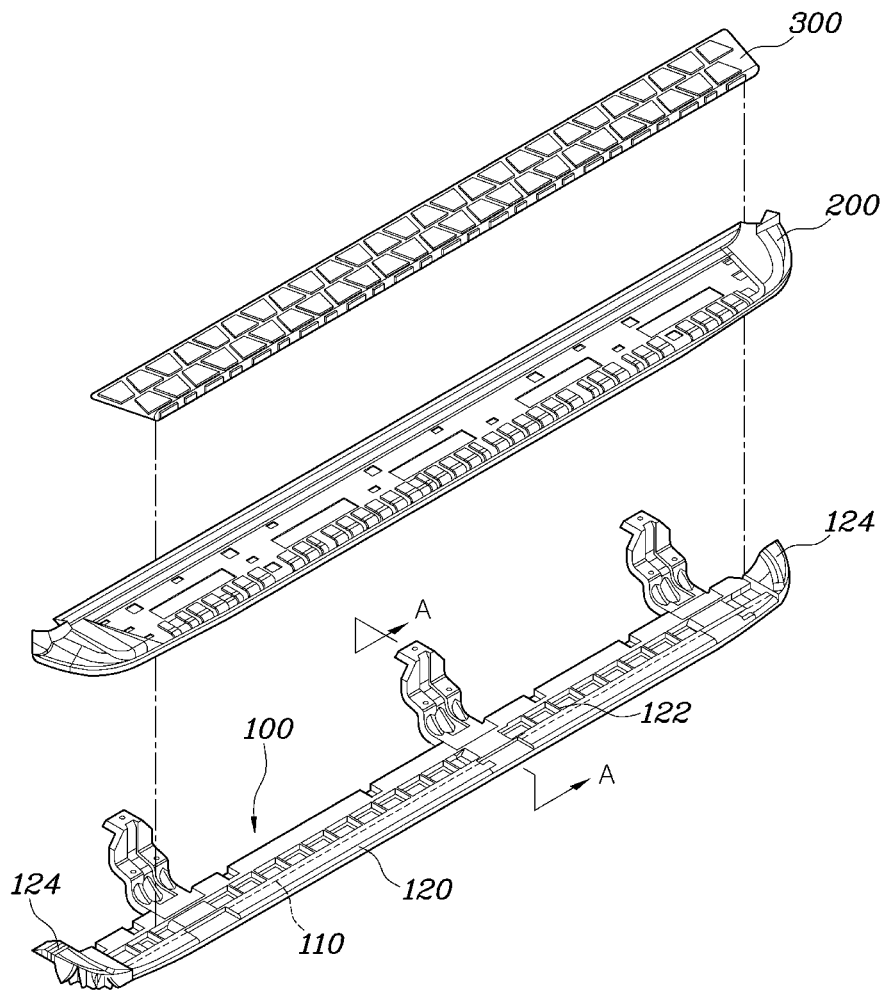
FIG. 3 is an exploded perspective view showing a side step of a vehicle according to the present invention.
Figure 4:
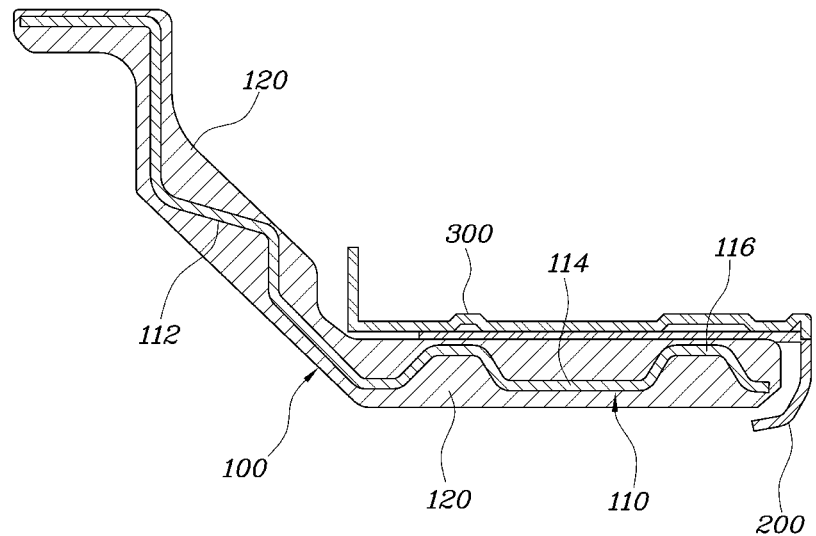
FIG. 4 is a sectional view taken along line A-A of FIG. 3.
Figure 5:
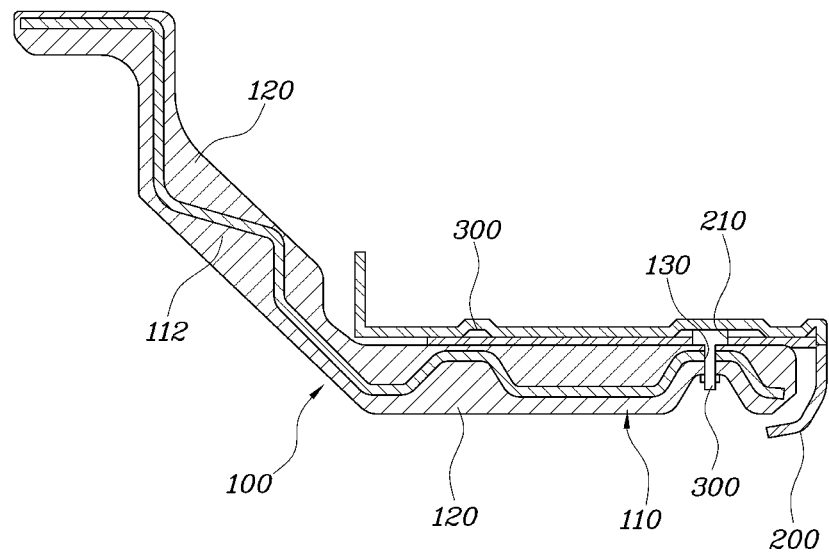
FIG. 5 is a view showing a state where the main frame, a step cover, and a step plate are assembled by using a locking mechanism according to the present invention.
Figure 6:
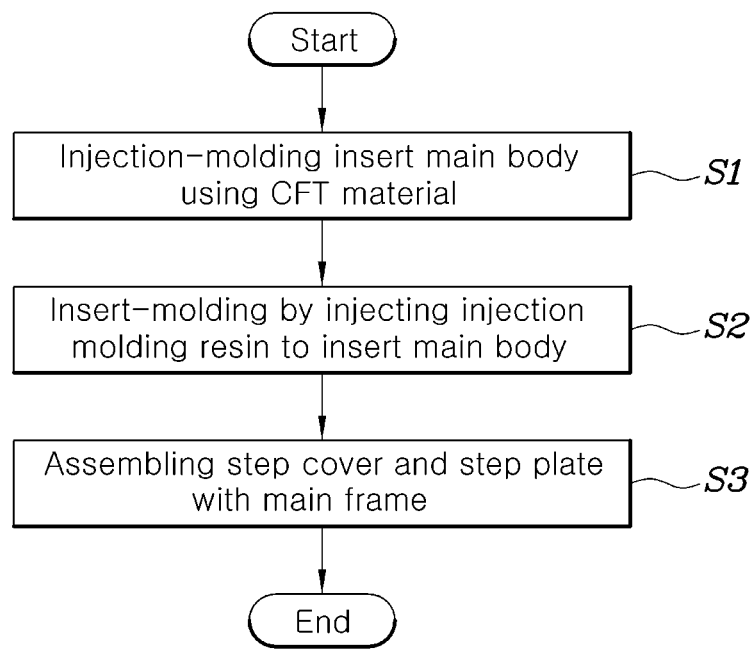
FIG. 6 is a flow chart showing a method of making a side step for a vehicle according to the present invention.

FIG. 1 is a perspective view showing an insert main body and a bracket that form a main frame according to the present invention; FIG. 2 is a perspective view showing the main frame in a state where an injection molding resin is coupled to the insert main body according to the present invention; FIG. 3 is an exploded perspective view showing a side step for a vehicle according to the present invention; FIG. 4 is a sectional view taken along line A-A of FIG. 3; FIG. 5 is a view showing a state where the main frame, a step cover, and a step plate are assembled by using a locking mechanism according to the present invention; and FIG. 6 is a flow chart showing a method of making a side step for a vehicle according to the present invention.

A side step for a vehicle according to the present invention is an accessory as an assistant foothold that is provided on a lower side of a vehicle to offer convenience when passengers get in or get out of the vehicle, wherein the side step includes: a main frame 100 that is molded through injection-molding; a step cover 200 that is assembled with the main frame 100; and a step plate 300.

The main frame 100 includes: an insert main body 110 that is molded as a frame by using a continuous fiber thermoplastic (CFT) material; and an injection molding resin 120 that is injected to the insert main body 110 during insert-molding.

The insert main body 110 is molded to be relatively long, for example, a length from a front door to a rear door of a vehicle. As shown in FIG. 4, the insert main 110 body is provided with a section having a successive convex 116-concave 114 shape to improve rigidity thereof.

At least one bracket 112 may be molded and be coupled to the insert main body 110.

The bracket 112 is mounted and coupled to a lower part of the vehicle, wherein the bracket 112 may be in a stepwise shape so as to enlarge cross sectional area thereof.

The insert main body 110 including the bracket 112 may come in various cross-sectional structures, thicknesses, or shapes. A material of the insert main body 110 may include one or more materials selected from among glass fiber, natural fiber, carbon fiber, aramid fiber, and ultrahigh molecular weight polyethylene (UHMWPE).

Further, a composition of a thermoplastic resin from a CFT material may include one or more materials selected from among polypropylene, polyethylene, polyamide, and a composition of polyester and polyphenylene sulfide.

Preferably, the composition of a thermoplastic resin from a CFT material may include about 30 to 50% by weight of polypropylene (PP) that is staple fiber among polypropylene (PP), nylon6, and nylon66, about 50 to 70% by weight of glass fiber (GF), and other inevitable impurities, and more preferably, may include about 40% by weight of polypropylene (PP) and about 60% by weight of glass fiber (GF).

Further, an injection molding resin 120 that is injected to the insert main body 110 during the insert-molding, completing the main frame 100, the injection molding resin 120 may be integrally molded to all over the insert main body 110 through the insert-molding. The injection molding resin 120 may be made of a material that has greater rigidity than that of the insert main body 110. In other words, the injection molding resin 120 may be made of a material that has same or more composite fiber content than that of the insert main body 110. In particular, in the case that the injection molding resin 120 is made of the same or a like composite material as the insert main body 110, it is possible to obtain enough adhesive strength without adhesive or welding.

For example, the injection molding resin 120 may include one or more materials selected from among polypropylene, polyethylene, polyimide, and a composition of polyester and polyphenylene sulfide, preferably may include about 50 to 70% by weight of polypropylene (PP) that is selected from among polypropylene (PP), nylon6, and nylon66, about 30 to 50% by weight of long glass fiber (LGF), and other inevitable impurities, and more preferably may include about 60% by weight of polypropylene (PP) and about 40% by weight of long glass fiber (LGF).

Further, polypropylene, which is a polymer made from propylene and is lightest, polypropylene has a good resistance to heat and electrical properties, and is harmless. In addition, glass fiber (GF) has a resistance to high temperature, and chemical durability, whereby glass fiber (GF) is not corroded, and has great tensile strength.

Further, the main frame 100 may be provided with ribs 122 along a longitudinal direction of the main frame 100 to improve rigidity thereof during the insert-molding the main frame 100 by injecting the injection molding resin 120, wherein the ribs 122 are spaced apart from each other at a predetermined interval.

Furthermore, when the injection molding resin 120 is injected to the insert main body 110 during the insert-molding, a support injection molding resin 124 is integrally molded to each of opposite longitudinal ends of the insert main body 110. Thus, it is possible to obtain rigidity of the opposite longitudinal ends of the main frame 100 via the support injection molding resin 124. In addition, it is possible to secure a stepping area, to support thereof, and to prevent the insert main body 110 made of a CFT material from being exposed to the outside.

Meanwhile, a step cover 200 that is seated on an upper surface of the main frame 100 is molded out of a synthetic plastic of TOP material or polypropylene material so as to have durability and resilience, and to provide passengers with cushion when getting in or getting out of the vehicle. In particular, the step cover 200 may be molded to have a predetermined thickness during the injection-molding, in order to have durability during side impacts.

Further, a step plate 300 is seated on an upper surface of the step cover 200 in a corresponding manner, wherein the step plate 300 may be molded out of synthetic plastic of TOP material or polypropylene material through injection-molding. The step plate 300 is capable of preventing skidding when getting in or getting out of the vehicle via nonskid treatment.

Hereinbelow, reference will be made to a manufacturing process of a side step for a vehicle according to the present invention.

The method of making a side step for a vehicle includes: as shown in FIG. 5, disposing at least one bracket 112, which is mounted to a lower part of a vehicle body, to a mold, and injection-molding the insert main body 110 using the CFT material, wherein the insert main body 110 actually bears weight and is configured to extend in a longitudinal direction thereof so as to connect the bracket 112 (S1); insert-molding by injecting the injection molding resin 120 to the insert main body 110 (S2); and assembling the step cover 200 and the step plate 300 with the main frame 100, which is completed after the injection molding resin 120 is inserted into the insert main body 110 (S3).

To be more specific, the insert main body 110 is provided with at most three or at least one bracket 112 through progressive forming process before insert-molding. In other words, after preparing the CFT material, the CFT material is primarily heated to approximately 225° C., and then at least two heated CFT materials are layered.

Next, the layered CFT materials are secondarily heated to approximately 225° C., and then the layered CFT materials are molded into the bracket 112.

Further, at least one bracket 112 is disposed in the mold while spacing the bracket 112 from an adjacent bracket 112 at a predetermined interval, and then the CFT material is injected and molded into the insert main body 110 that is integrally coupled to the bracket 112 (step S1).

The bracket 112 and the insert main body 110 may be made of the same material so that the bracket and the insert main body are integrally coupled to each other through adhesion between material surfaces thereof caused by high temperature during the injection-molding.

Next, the insert main body 110 is disposed in the mold, and then the injection molding resin 120 is coupled to all over the insert main body 110 through insert-molding.

Herein, a method of insert-molding includes, but is not limited to, conventional insert-molding that the insert main body 110 is disposed in the mold and then the composition of the thermoplastic resin is injected to the mold.

Further, the injection-molding condition may be set as components of the composition of the thermoplastic resin, namely about 60% by weight of polypropylene (PP) and about 40% by weight of long glass fiber (LGF), so as to be impregnated.

Further, ribs 122 or bosses may be molded during the insert-molding the main frame 100 by injecting the injection molding resin 120. Here, the injection molding resin 120 can be molded while molding the ribs 122 or the bosses because the main frame 100 can be molded through insert-molding.

The main frame 100 is provided with the ribs 122 along a longitudinal direction of the main frame 100, wherein the ribs 122 are spaced apart from each other at a predetermined interval (step S2).

Next, the step cover 200 that is molded through additional injection-molding is seated on the upper surface of the main frame 100 that is completed through insert-molding, and then the step plate 300 is seated on the upper surface of the step cover 200. Lastly, the main frame 100, the step cover 200, and the step plate 300 are integrally assembled by using a locking mechanism 310, such as a bolt, whereby manufacturing the side step is completed (step S3).

The locking mechanism 310 is integrally provided in the step plate 300 when the step plate 300 is made, wherein the step cover 200 and the main frame 100 are provided with assembly holes 130 and 210, respectively for allowing the locking mechanism 310 to pass through.

As described hereinbefore, the side step according to the present invention is manufactured by injecting the injection molding resin 120, which is made of polypropylene (PP) and long glass fiber (LGF), to all over the insert main body 110 that is made of the CFT material, through insert-molding. Thereby, it is possible to have structural rigidity and improved crash-worthiness, and to reduce weight and manufacturing cost. Further, it is possible to considerably improve the structural rigidity of all of assemblies where the step plate 300 and the step cover 200 are assembled.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of making a side step for a vehicle, the method comprising the steps of:
    injection-molding at least one bracket using a continuous fiber thermoplastic (CFT) material, the bracket being mounted to a vehicle body and an insert main body that is integrally coupled to the bracket;
    insert-molding a main frame by injecting an injection molding resin over the insert main body that is coupled to the bracket; and
    manufacturing a side step by assembling a step cover and a step plate with the main frame, wherein the step of manufacturing the side step further comprises:
        seating the step cover on the main frame;
        seating the step plate on the step cover; and
        integrally assembling the main frame, the step cover, and the step plate using a locking mechanism that is integrally provided in the step plate.

2. The method of claim 1, wherein the step of injection-molding the bracket further comprises:
    layering at least two heated CFT materials after primarily heating the CFT materials to a predetermined temperature; and
    molding the layered CFT materials after secondarily heating the layered CFT materials to a predetermined temperature.

3. The method of claim 1, wherein the step of insert-molding the main frame further comprises:
    disposing the bracket in a mold while spacing the bracket from an adjacent bracket at a predetermined interval; and
    injection-molding the CFT material for allowing the insert main body to be integrally coupled to the bracket.

4. The method of claim 1, wherein the bracket and the insert main body are made of a same material so that the bracket and the insert main body are integrally coupled to each other through adhesion between material surfaces thereof caused by high temperature during the injection-molding step.

5. The method of claim 1, wherein when the injection molding resin is injected to the insert main body during the insert-molding step, a support injection molding resin is integrally molded to each of opposite longitudinal ends of the insert main body.

6. The method of claim 1, wherein the insert main body comprises about 30 to 50% by weight of polypropylene (PP), and about 50 to 70% by weight of glass fiber (GF).

7. The method of claim 1, wherein the insert main body comprises about 40% by weight of polypropylene (PP) and about 60% by weight of glass fiber (GF).

8. The method of claim 1, wherein the insert main body is provided with a section having a successive convex-concave shape to improve rigidity thereof.

9. The method of claim 1, wherein the injection molding resin comprises about 50 to 70% by weight of polypropylene (PP), and about 30 to 50% by weight of long glass fiber (LGF).

10. The method of claim 1, wherein the injection molding resin comprises about 60% by weight of polypropylene (PP) and about 40% by weight of long glass fiber (LGF).

11. The method of claim 1, wherein the main frame is provided with ribs along a longitudinal direction of the main frame to improve rigidity thereof during the insert-molding the main frame by injecting the injection molding resin, the ribs being spaced apart from each other at a predetermined interval.

* * * * *